Nov. 28, 1939.  E. RENNER  2,181,464
SWINGING GATE OR THE LIKE
Filed March 31, 1938
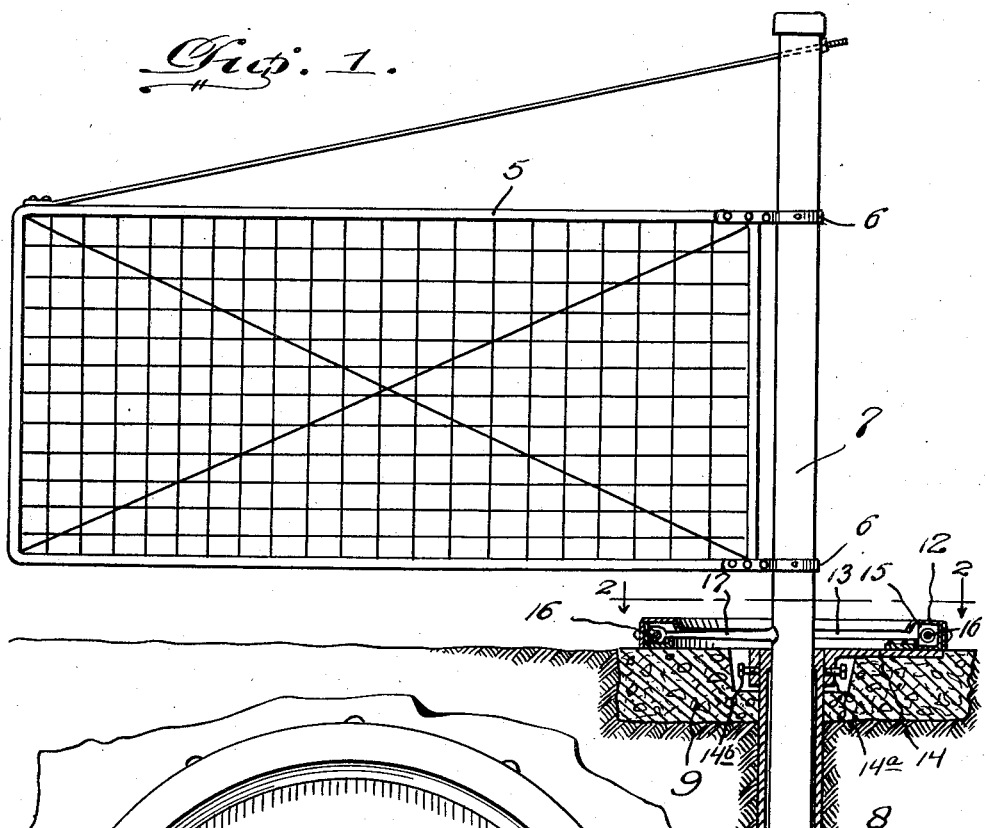
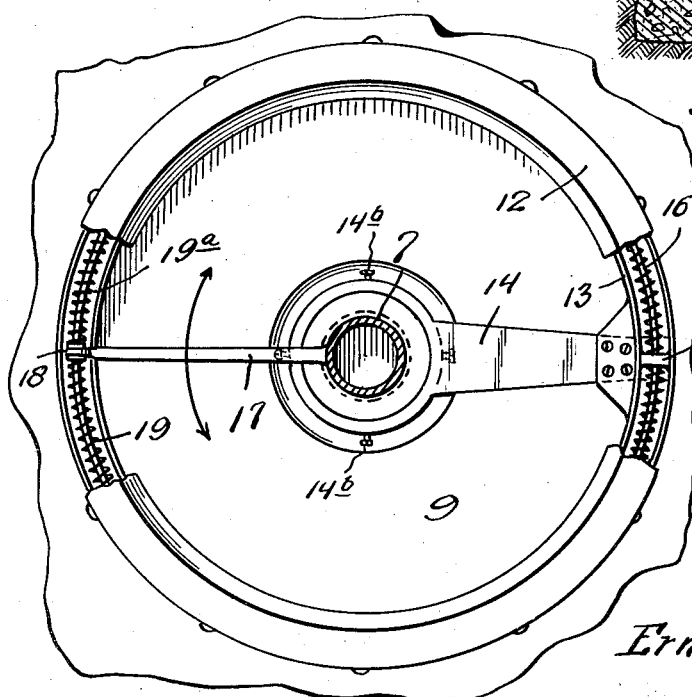
Inventor
Ernest Renner,
By J. Stanley Bunch
Attorney Patented Nov. 28, 1939

2,181,464

UNITED STATES PATENT OFFICE 2,181,464

SWINGING GATE OR THE LIKE

Ernest Renner, Sioux Falls, S. Dak.

Application March 31, 1938, Serial No. 199,226

3 Claims. (Cl. 39—84)

This invention relates to improvements in yieldable horizontally swinging supports, gates or barriers, and an object of the present invention is to provide simple and efficient means to return the gate or barrier to a normal or closed position.

A further object is to provide a simple and efficient gate or barrier which will be self-closing and which will swing in either direction.

Other objects and features of the present invention will become apparent from the following description when considered in connection with the accompanying drawing, in which:

Figure 1 is a view, partly in side elevation and partly in vertical section of a gate or barrier constructed in accordance with my invention; and Figure 2 is a horizontal section on line 2—2 of Figure 1 with parts broken away.

Referring in detail to the drawing, 5 is the gate or barrier member proper, which may be of any desired or preferred construction and which is secured at one end or vertical edge, as at 6, to a vertical post 7 journaled at its lower end in an elongated vertical socket 8. The socket 8 is embedded in the ground with its upper end portion set in cement as at 9 so that the upper end of the socket is flush with the upper surface of the cement 9 and the surface of the ground. Sufficient clearance is provided between the major portion of the socket 8 and the lower end of post 7, as at 10, to provide for packing in grease, and to thereby insure efficient lubrication and minimize frictional contact between socket 8 and post 7. Thus, the post 7 will rotate easily and noiselessly, and wear will be minimized. The post 7 preferably has a pointed lower end 11 contacting the bottom of socket 8 to afford an efficient end thrust bearing.

Arranged on the concrete 9 in concentric surrounding relation to the post 7 and socket 8 is a hollow horizontal ring 12 open or slotted as at 13 around its inner periphery and anchored to the socket 8 by means of a radial arm 14 having a collar 14a removably secured on the upper end of socket 8 by set screws 14b. An abutment 15 is fixed in the hollow ring 12, and centrally arranged in said hollow ring 12 is a circular rod 16. Rigid with post 7 is a horizontal arm 17 projecting into the hollow ring 12 parallel with and in the direction of gate proper 5. The outer end of arm 17 has an apertured head 18 slidably engaging the rod 16, and encircling the rod 16 at opposite sides of abutment 15 and the head 18 are helical springs 19 and 19a. The springs 19 and 19a act on arm 17 to yieldingly retain the gate or barrier 5 in a normal or closed position, and will return the gate or barrier to such position after being swung laterally or open in either direction. In other words, one spring 19 or 19a will be compressed, depending upon the direction in which the gate is swung from normal position, and when the gate is released, the compressed spring will expand and act on arm 17 to return the gate to such position. The ring 12 may be suitably covered to protect the parts therein from the elements, and it will be seen that the device is extremely simple, durable and efficient. Minor changes in the exact details shown and described are contemplated within the spirit and scope of the invention as claimed.

What I claim as new is:

1. In combination with a gate member, a vertical elongated socket embedded in the ground, a vertical post having its lower end journaled in said socket and having said gate member rigid with the upper portion thereof, a horizontal arm rigid with and projecting from said post, spring means acting on said arm to yieldingly maintain said gate member in a normal position and to automatically return it to said position when swung laterally in either direction, said spring means including a slotted hollow ring fixedly mounted adjacent the top of said socket concentric with said post and having said arm projecting therein, and compression springs arranged in said hollow ring and bearing against opposite sides of the outer end of said arm.

2. In combination with a gate member, a vertical elongated socket embedded in the ground, a vertical post having its lower end journaled in said socket and having said gate member rigid with the upper portion thereof, a horizontal arm rigid with and projecting from said post, spring means acting on said arm to yieldingly maintain said gate member in a normal position and to automatically return it to said position when swung laterally in either direction, said spring means including a slotted hollow ring fixedly mounted adjacent the top of said socket concentric with said post and having said arm projecting therein, compression springs arranged in said hollow ring and bearing against opposite sides of the outer end of said arm, and a ring-like guide rod fixed centrally in said hollow ring and slidably engaged by the outer end of said arm, said guide rod extending through said springs.

3. In combination with a gate member, a vertical elongated socket embedded in the ground, a vertical post having its lower end journaled in said socket and having said gate member rigid with the upper portion thereof, a horizontal arm rigid with and projecting from said post, spring means acting on said arm to yieldingly maintain said gate member in a normal position and to automatically return it to said position when swung laterally in either direction, said spring means including a slotted hollow ring fixedly mounted adjacent the top of said socket concentric with said post and having said arm projecting therein, compression springs arranged in said hollow ring and bearing against opposite sides of the outer end of said arm, a ring-like guide rod fixed centrally in said hollow ring and slidably engaged by the outer end of said arm, said guide rod extending through said springs, and a radial arm rigid with said hollow ring and having a collar at its inner end fitted and secured on the upper end of said socket to so fixedly mount the ring.

ERNEST RENNER.